March 8, 1960

M. J. LAWRENCE 2,928,037

THERMISTOR LIQUID LEVEL SWITCH

Filed Dec. 2, 1954

Inventor

MAXWELL J. LAWRENCE

By Leonard H. King

AGENT

INVENTOR.
MAXWELL J. LAWRENCE
BY
Leonard H. King
AGENT

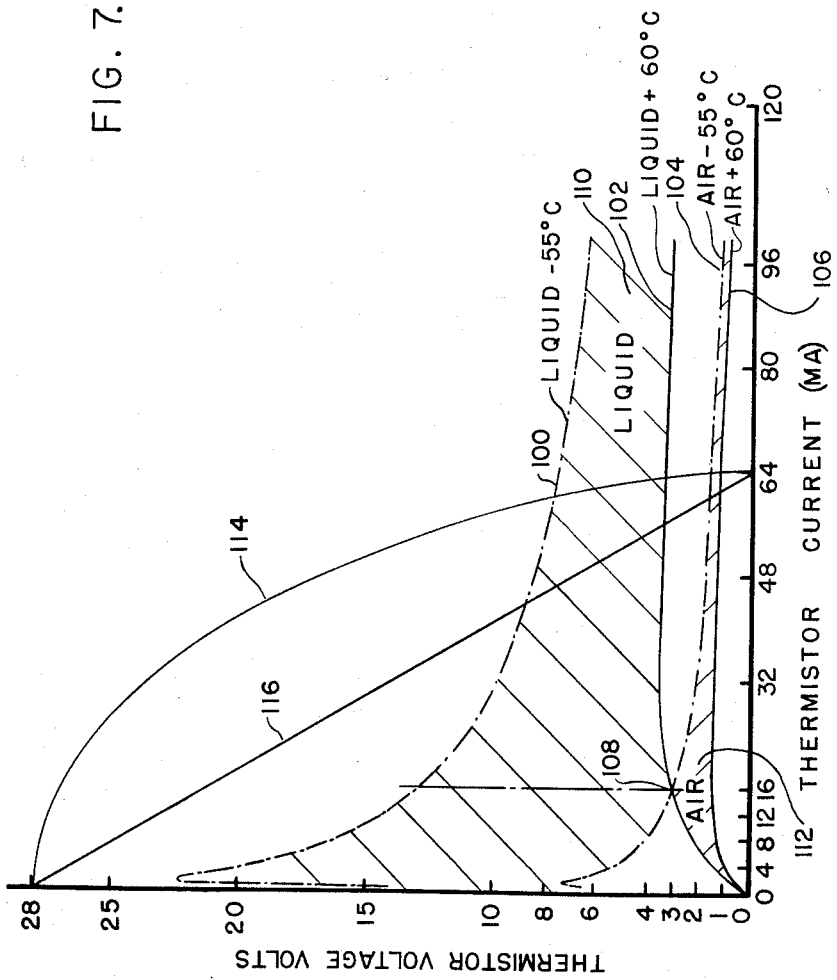

ગ્ર2,928,037

THERMISTOR LIQUID LEVEL SWITCH

Maxwell J. Lawrence, Brooklyn, N.Y., assignor to Avien, Inc., Woodside, N.Y.

Application December 2, 1954, Serial No. 472,673

7 Claims. (Cl. 323—68)

This invention relates to liquid level sensing devices and more particularly to a level sensing bridge network employing thermistors.

The derivation of the word "thermistor" arises out of the contraction of the expression "thermally sensitive resistor." Thermistors may be made quite small, are rugged, have been found to have a long life and require little maintenance.

One type of thermistor particularly suitable to the application of this invention, is a semiconductor that has a high negative temperature coefficient of resistance and thus is extremely sensitive to relatively small temperature variations. When such a thermistor is subjected to a rising temperature, its resistance decreases with the increase in temperature, and likewise, when subjected to a falling temperature, there is an increase in thermistor resistance.

For a typical thermistor, a resistance change by a factor of about one thousand is not uncommon over a temperature range of from 0° centigrade to 300° centigrade. Over this same temperature range the resistance of a typical metal, such as platinum, will increase approximately by a factor of two.

One of the most interesting and useful properties of a thermistor is the way in which the voltage, V, across it changes as the current, I, through it increases at a constant ambient temperature. For sufficiently small currents, the power dissipated is too small to appreciably heat the thermistor, hence I is directly proportional to V, and Ohm's law is followed. However, as the current assumes larger values, the power dissipated increases, the temperature rises above ambient temperature, the resistance decreases, and hence the voltage drop across the thermistor is less than it would have been had the resistance remained constant. At some relatively low current value, the voltage attains a maximum or peak value. Beyond this maximum voltage point, as the current increases, the voltage decreases, and the thermistor is said to have a negative coefficient of resistance whose value is $$\frac{dV}{dI}$$

For a particular thermistor, the position of the characteristic curve, when V versus I is plotted, may be shifted by changing the degree of thermal coupling between the thermistor and its surroundings. This is usually accomplished by either changing the air pressure around the thermistor, or by changing the medium surrounding the thermistor. In effect this changes the dissipation constant, C, of the thermistor. The value of C can be readily determined from the V versus I curve. For any point on V versus I curve $$\frac{V}{I}$$

is the resistance while V times I is W, the power dissipated, in watts. If a plot is made of power dissipated (W) versus temperature rise (T) of the thermistor for a series of values of V and I, it will be seen that for thermistors in a medium which conducts most of the heat away, W will increase linearly with T, so that C is constant. For thermistors suspended by fine wires in a vacuum, W will increase more rapidly than proportional to T, and C will increase with T. For thermistors of ordinary size and shape, in still air $$\frac{C}{\text{area}}$$

is equal to from 1 to 40 milliwatts per degree centigrade per square centimeter depending on the size and shape factor.

The present-day high speed, long range aircraft have their fuel tanks distributed throughout the fuselage as well as in the wings. It becomes imperative, particularly in multi-engine jet aircraft, where the fuel is rapidly consumed, that the flight engineer be advised when the level of the fuel in a tank has dropped below a prescribed minimum so that he may accurately program the withdrawal of fuel from any tank. This is necessary to prevent an unbalance of the aircraft due to the withdrawal of fuel from one tank to the exclusion of the others. It is also of prime importance, particularly in the case of single engine jet aircraft, to provide an efficient, yet simple, quick-acting automatic fuel tank switching system which relieves the pilot of the necessity of constantly performing this task manually, and to provide an automatic means for switching from one disposable wing-tip tank to another. It also is very important to have an automatic device that will either provide a signal for the pilot to denote when he may jettison his wing tanks or perform the jettisoning operation automatically.

When refueling aircraft while in flight, a need exists for a device for accurately sensing a full tank. It is imperative this device quickly actuate a shut-off valve, so as to protect the tank from bursting or overflowing. The device of this invention is admirably suited for this purpose.

Another use to which my invention is particularly well adapted, is found in the field of guided missiles. In this connection it should be borne in mind that fuel tanks in guided missiles are usually found in every available unused space or corner. Since some tanks, under these conditions, hold more fuel than others, a serious problem arises in maintaining the stability of the craft as fuel is withdrawn from the numerous tanks located throughout the body. Therefore, when the subject of fuel programming in guided missiles is initially approached, the designer seeks a device that will quickly and accurately switch fuel tanks in a prescribed order. With my invention, it is possible to have a lightweight, simple device to switch from any fuel tank, anywhere in the missile, to any other fuel tank as soon as the fuel level in the feeding tank drops below a predetermined minimum.

It is therefore an object of this invention to provide a lightweight, compact, sensitive device capable of quickly sensing and indicating changes in liquid levels.

Another object of this invention is to provide a new and improved, accurate warning means for indicating when a liquid has reached a predetermined level.

A further object of my invention is to provide a new and improved liquid level control device suitable for use with highly combustible fluids.

A still further object of this invention is to provide a new and improved level switch or control device, suitable for use with aircraft fuel, that is not subject to the boiling effect of fuel when the aircraft rapidly rises from one atmosphere to a relatively thinner atmosphere.

A still further object of this invention is to provide a new and improved level switch or control device capable of operating over a wide temperature range.

An important object of this invention is to provide a new and improved apparatus for detecting liquid levels quickly and accurately without utilizing moving parts.

Another important object of this invention is to provide a new and improved apparatus for detecting liquid levels characterized by the use of but few components.

A still further important object of this invention is to provide a new and improved lightweight, accurate, sensitive control system that is rugged and can easily withstand the abuse and vibration that aircraft instruments are subjected to, yet may be easily replaced with a minimum of time and effort.

A particular object of this invention is to provide a liquid level sensing apparatus having low power consumption.

Further objects and advantages of my invention will become apparent from the following description and appended claims and from the accompanying drawings, in which:

Fig. 7 is a plot of thermistor voltage versus thermistor current and denoting the characteristic curves of a typical thermistor when the surrounding medium and the temperature of the surrounding medium is varied.

Figure 1:
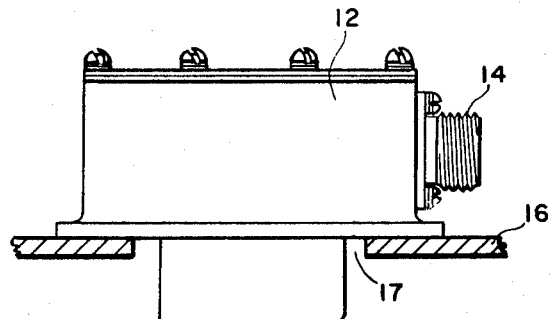
Fig. 1 is a view of a probe employed as a liquid level indicator, showing the complete assembly and the relative placement of the upper housing and the sensing thermistor in the probe.
Figure 2:
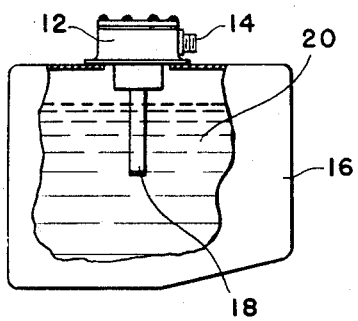
Fig. 2 is a view, partly in section, of the housing and probe in a typical tank installation for use as a level switch.
Figure 5:
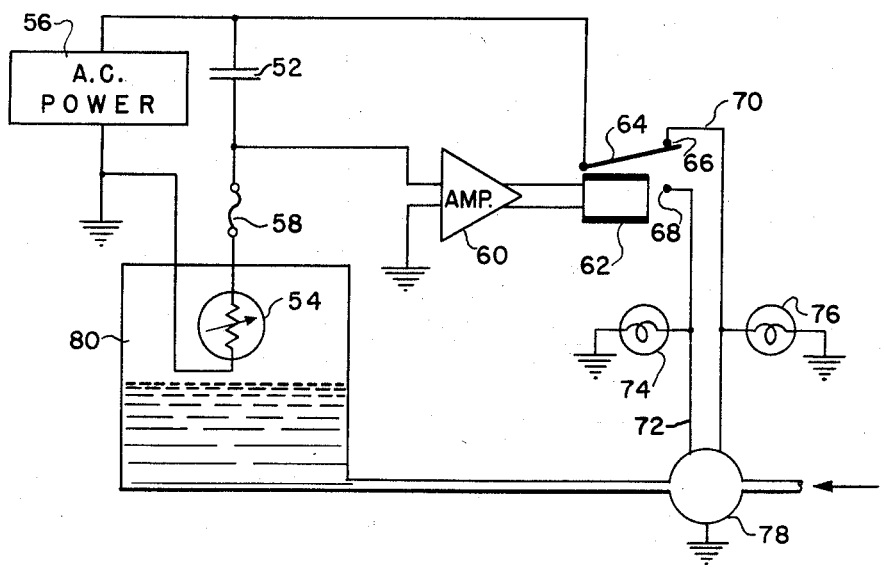
Fig. 5 is a schematic circuit diagram of my improved circuit, constructed in accordance with the principles of my invention.

Referring now to Fig. 1, liquid level indicator 10 is shown as comprising a housing 12, having contained therein, not shown, the relay 62, and capacitor 52 of Fig. 5. Connector 14 provides the pin connections, also not shown, for supplying the operating potential and the output connections of relay 62 of Fig. 5 to a circuit to be controlled, such as a switch for an electric pump or flow control valve 78. Level switch 10 is shown extending through aperture 17 of tank 16 and having its probe 18 disposed within the tank. Probe 18 is shown as being vented by apertures 22 which permit the fluid to be sensed to circulate freely with the probe, and maintaining the liquid in the probe at the same level as the liquid in the tank. The vented probe also acts as a baffle to prevent the thermistor from being uncovered during a rapid change in attitude of the tank and to minimize the effect of sloshing fuel. The vents also provide a time delay if they are made small. If the vents are made sufficiently small, the fluid drains from the probe at a slower rate than the rate at which the fluid is being used. Thus it may serve as a controlled time delay for the purpose of having the operation continued for an additional, predetermined time.

Figure 3:
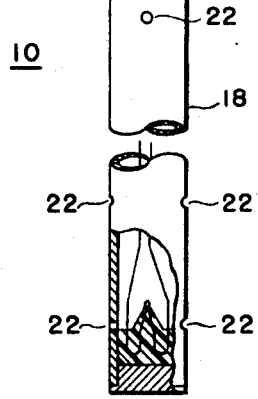
Fig. 3 is an enlarged, fragmentary, sectional view of the lower portion of the probe of Fig. 1.
Figure 3:
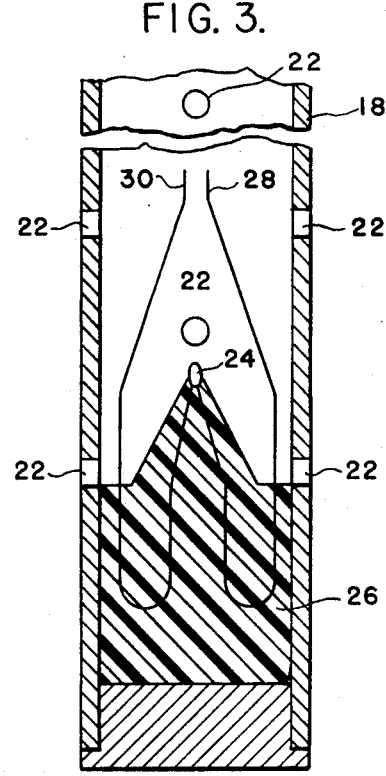

Fig. 3 is an enlarged sectional view of the lower portion of probe 18 of Fig. 1 wherein the relative placement of vent holes 22 are shown in relation to the sensing thermistor 24, the thermistor base 26 and thermistor lead wires 28 and 30.

Figure 4:
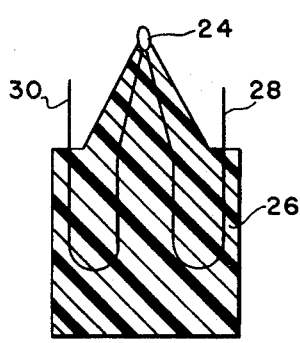
Fig. 4 is an enlarged, fragmentary, sectional view of the sensing thermistor bead shown embedded in a non-conductive plastic material.

Fig. 4 is an enlarged, fragmentary view of sensing thermistor 24 shown partially embedded in a plastic non-conductive material 26 and thermistor lead wires 28 and 30 also partially embedded in plastic 26. This is done so as to expose the maximum thermistor surface area consistent with structural rigidity.

An important feature of this construction is the positioning of thermistor bead 24 facing upwardly. As the liquid level decreases, the bead is uncovered and droplets run down the tapered walls of the plastic supporting structure 286. The dry thermistor bead 24 will quickly assume a temperature substantially above ambient, due to self-heating. If the bead were inverted it may be appreciated that a droplet would form and due to the cohesive force of the liquid, hang from the thermistor 24 until evaporated from the surface. The time required for the droplet to be evaporated is often longer than can be tolerated. The operation of refueling an airplane is normally carried out with the fuel under pressure and it is necessary to stop the flow of fuel into the tanks before the tanks rupture. If the full sensing means, such as the level switch of this invention, has a long time delay, it may be ineffective as respects timely actuation of the fuel flow control equipment. The probe shown provides almost instantaneous sensing of a change in ambient conditions. A carefully predetermined time delay to overcome false indications is provided by the vented probe 18 as discussed earlier.

One embodiment of this invention is disclosed in Figure 5 wherein a capacitor 52 and a thermistor element 54 are connected in series with a source of power 56. A fuse 58 is inserted in series with the thermistor to prevent excessive heating of the thermistor element 54 in the event of accidental short circuiting of the capacitor 52 which fault would apply the full voltage of power source 56 to the thermistor. An amplifier 60 is connected across the series combination of fuse 58 and the thermistor element 54. The output of the amplifier is in turn applied to relay 62 which actuates relay arm 64. Arm 64 normally completes a circuit between the power source 56 and contact 66. When relay 62 is energized, relay arm 64 makes contact with terminal 68. Amplifier 60 is so biased that the relay 62 is actuated only when the voltage across the thermistor exceeds a certain value. To relay contacts 66 and 68, there are connected through suitable conductors 70 and 72 respectively, indicating lamps 74 and 76 which serve to indicate which contact, 66 or 68, is energized, and accordingly, if the thermistor 54 is in air or liquid. Lamps 74 and 76 may be installed on the instrument panel of an aircraft to provide the pilot with a visual indication of the level condition. In flight the illumination of the lamp 76 may be a warning of low level and therefore an indication that the pilot should return to his home base.

Liquid flow control means 78, which may be a solenoid or motor operated valve or a liquid transfer pump, may be controlled by the condition of relay 62 so as to provide the desired liquid flow control action between tank 80 and a source of supply (not shown). In some installations, it is convenient to locate one thermistor in the upper section of the tank to sense full conditions and to act as a full control so as to shut off further flow of liquid. A second thermistor may be located in the lower part of the tank where it can act as a low level control to actuate a warning lamp or to energize pump 78 to transfer fuel from another tank (not shown).

Figure 6:
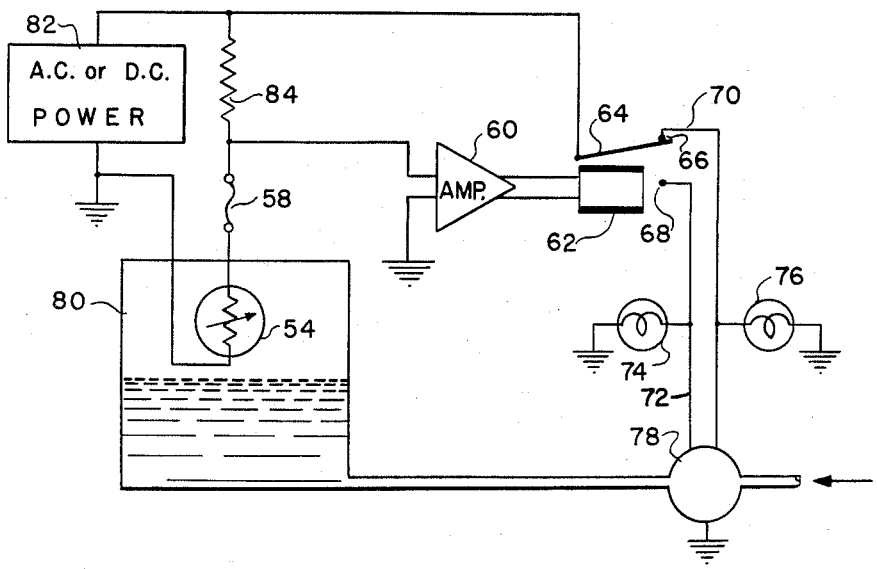
Fig. 6 is a schematic circuit diagram of alternate embodiment of my improved circuit.

In Fig. 6 an alternate embodiment of this invention is shown which may be used in conjunction with either an A.C. or D.C. power source 82. This circuit substitutes a resistor 84 in place of the capacitor 52 of the embodiment of Fig. 5. The circuit of Fig. 6 is unaffected by the wave shape or frequency of the applied voltage.

Referring now to Fig. 7 wherein the plots of the characteristic curves of a typical thermistor are shown. Curve 100 shows the response of the thermistor in liquid at −55° C., curve 102 shows the response of a thermistor in liquid at 60° C., curve 104 shows a thermistor in air at −55° C., while curve 106 shows the response of a thermistor in air at 60° C. Point 108 is the cross-over point for a temperature range of −55° C. to 60° C. To the right of point 108 the voltage drop across the thermistor in liquid at any temperature is greater than the voltage drop for the thermistor in air at room temperature. The volt-ampere curves of this typical thermistor in air and in liquid over a temperature range, such as −55° C. to +60° C., fall in two distant bands. Band 110 represents the family of curves for the thermistor in liquid, while band 112 below the band 110 is for the thermistor in air. Since there is a considerable separation between bands 110 and 112, as the thermistor environment is changed from liquid to air or vice versa, there is a sharp and distinct change in the voltage. Accordingly, a voltage responsive detector such as the combination of amplifier 60 and relay 62 will provide a distinct and a unique indication of whether the thermistor is in liquid or in air. Line 114 is the load line for the capacitive circuit of Fig. 5 whereas line 116 is the load line for the resistive circuit of Fig. 6.

While I have disclosed the best mode presently contemplated of carrying out the invention, be it understood that further modifications and changes may be made within the scope of the appended claims.

What is claimed is:

1. A condition sensing apparatus comprising in combination: a resistor in series connection with a thermistor element, a voltage responsive means in parallel with said thermistor element, and means to support said thermistor in operative relationship with the condition to be sensed, wherein said supporting means comprises a hollow cylindrical housing provided with at least one opening below the level of said thermistor and at least one additional opening substantially above said thermistor.

2. A condition sensing apparatus comprising in combination: a resistor in series connection with a thermistor element, a voltage responsive means in parallel with said thermistor element, and means to support said thermistor in operative relationship with the condition to be sensed, wherein said supporting means comprises a hollow cylindrical housing provided with at least one opening below the level of said thermistor and at least one additional opening substantially above said thermistor.

3. A thermistor probe assembly adapted for attachment to a tank comprising: a mounting flange adapted to be attached to said tank, a hollow cylinder extending from said flange into said tank, a thermistor mounted within said cylinder, said cylinder being provided with at least one opening at the level of said thermistor and at least one additional opening substantially above said thermistor, and means for connecting said thermistor with associated circuits external to said tank.

4. The assembly of claim 3 wherein said thermistor is mounted with its associated electrical leads extending normally downwardly from the said thermistor.

5. A probe for actuating a control means in response to a lowering of the level of a liquid below a point being monitored comprising a thermistor, means for supporting said thermistor at said point being monitored wherein the portion of said support means directly in contact with said thermistor is deployed below said thermistor.

6. The probe of claim 5 wherein said portion of said support means directly in contact with said thermistor is a substantially conically shaped synthetic resin body with said thermistor positioned substantially at the apex thereof.

7. The probe of claim 6 wherein there is embedded in said cone leads connected to said thermistor.

References Cited in the file of this patent
UNITED STATES PATENTS

| | | |
|---|---|---|
| 2,487,526 | Dahm et al. | Nov. 8, 1949 |
| 2,525,967 | Smoot | Oct. 17, 1950 |
| 2,526,251 | Medlar | Oct. 17, 1950 |
| 2,533,286 | Schmitt | Dec. 12, 1950 |
| 2,635,225 | Hadady | Apr. 14, 1953 |
| 2,667,178 | Fred et al. | Jan. 26, 1954 |
| 2,672,880 | Hermanson | Mar. 23, 1954 |